United States Patent
Duelli

(10) Patent No.: US 6,471,181 B2
(45) Date of Patent: Oct. 29, 2002

(54) SUSPENSION OF A VALVE PLATE OF A VACUUM VALVE

(75) Inventor: Bernhard Duelli, Uebersaxen (AT)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 09/759,027

(22) Filed: Jan. 11, 2001

(65) Prior Publication Data

US 2002/0130288 A1 Sep. 19, 2002

(51) Int. Cl.[7] .............................................. F16K 25/00
(52) U.S. Cl. ........................................ 251/85; 251/193
(58) Field of Search ............................ 251/84, 85, 87, 251/193

(56) References Cited

U.S. PATENT DOCUMENTS

| | | | | |
|---|---|---|---|---|
| 2,573,623 A | * | 10/1951 | Stover | 251/85 |
| 2,848,187 A | * | 8/1958 | Henry | 251/85 |
| 2,925,987 A | * | 2/1960 | Priesmeyer | 251/85 |
| 3,185,435 A | | 5/1965 | Hauser | |
| 3,310,277 A | * | 3/1967 | Nielsen | 251/84 |
| 3,820,755 A | * | 6/1974 | Greenwood et al. | 251/85 |
| 4,074,700 A | * | 2/1978 | Engle | 251/84 |
| 4,142,543 A | * | 3/1979 | Krause et al. | 251/85 |
| 4,337,920 A | * | 7/1982 | Parris | 251/84 |
| 4,560,141 A | | 12/1985 | Bosch | |
| 4,671,484 A | * | 6/1987 | Bergquist et al. | 251/84 |
| 4,759,331 A | * | 7/1988 | Sausner | 251/84 |
| 5,415,376 A | | 5/1995 | Ito | |
| 5,641,149 A | | 6/1997 | Ito | |
| 5,755,255 A | | 5/1998 | Iwabuchi | |
| 5,934,646 A | | 8/1999 | Tamura et al. | |
| 5,971,358 A | * | 10/1999 | Kennedy | 251/197 |
| 6,045,117 A | | 4/2000 | Tamura et al. | |
| 6,056,266 A | | 5/2000 | Blecha | |
| 6,082,706 A | | 7/2000 | Irie | |
| 6,095,180 A | | 8/2000 | Ishigaki et al. | |
| 6,283,446 B1 | * | 9/2001 | Sato et al. | 251/193 |

FOREIGN PATENT DOCUMENTS

| | | |
|---|---|---|
| DE | 32 09 217 | 10/1985 |
| DE | 32 24 387 | 5/1987 |
| DE | 196 33 798 | 2/1998 |
| EP | 1 028 278 | 8/2000 |

\* cited by examiner

Primary Examiner—Lesley D. Morris
Assistant Examiner—John Bastianelli
(74) Attorney, Agent, or Firm—Reed Smith LLP

(57) ABSTRACT

A suspension of a valve plate of a vacuum valve at a valve rod has a bearing block of rubber-elastic material with first and second side surfaces, one of which side surfaces is fastened to the valve rod or to a plate which is rigidly connected with the latter, and the other side surface is fastened to the valve plate or to a plate which is rigidly, connected with the latter, wherein an inelastic force transmission part is embedded in the rubber-elastic material of the bearing block and extends at oppositely located points or along oppositely located lines up to the side surfaces of the bearing block.

6 Claims, 5 Drawing Sheets

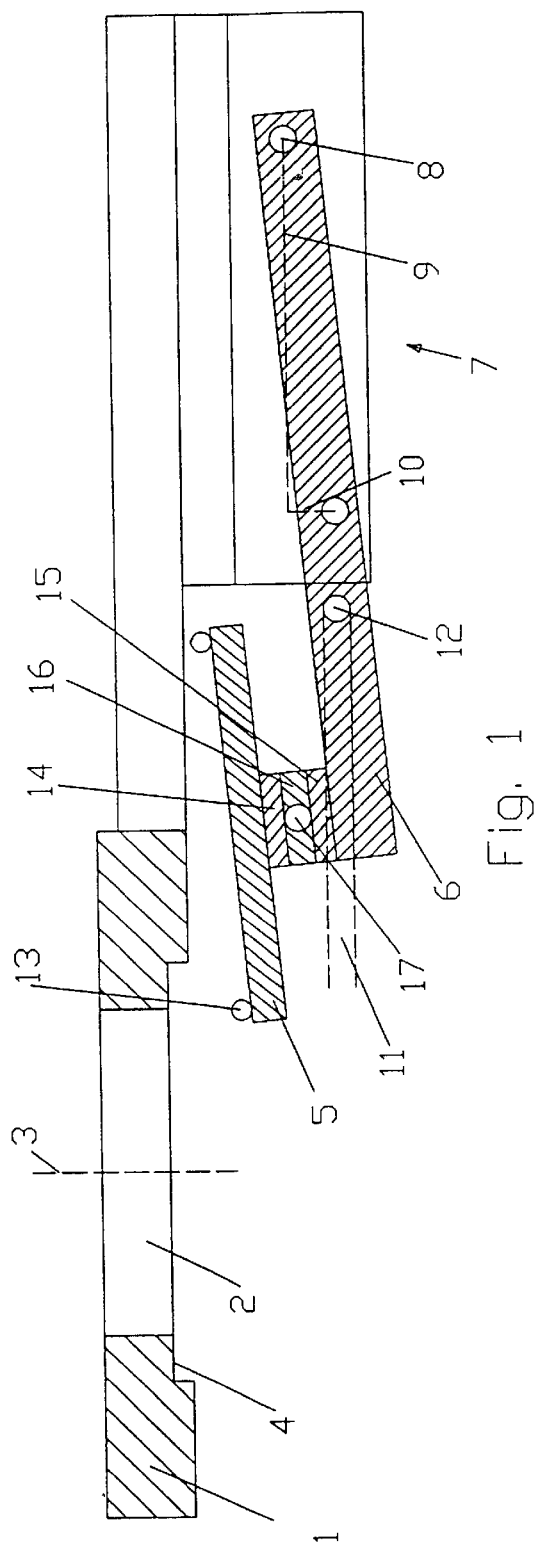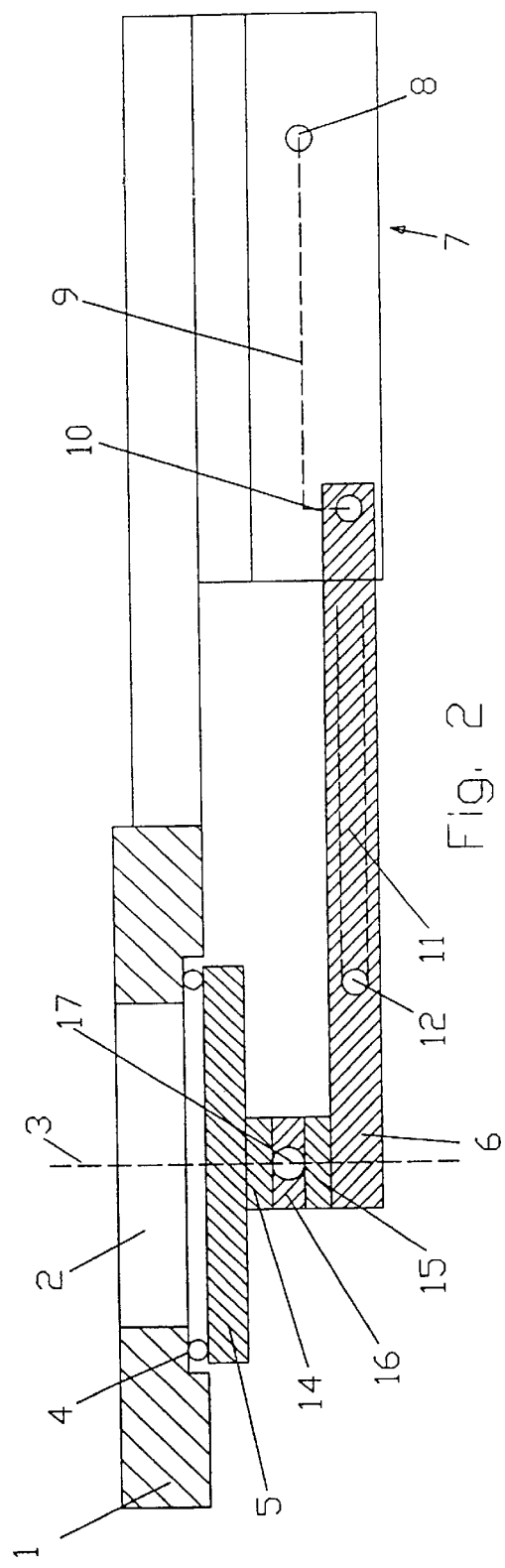

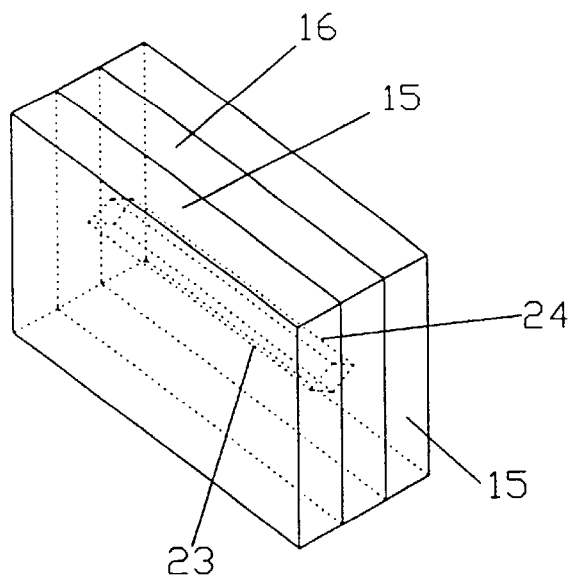
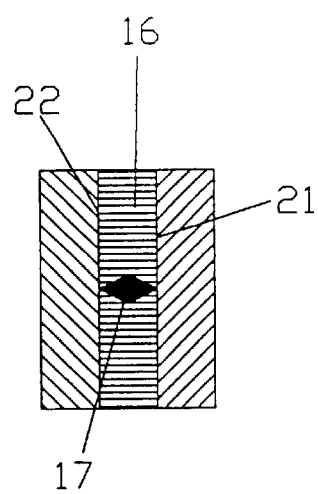
Fig. 6          Fig. 7
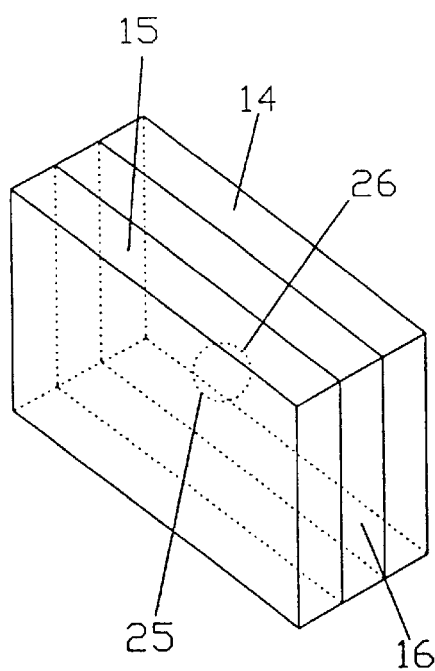
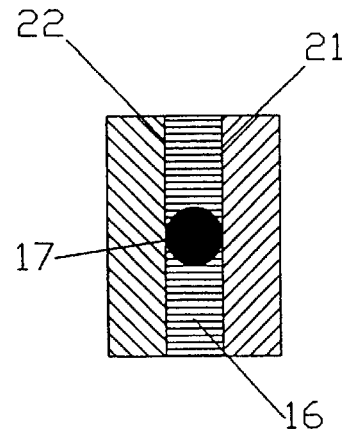
Fig. 8          Fig. 9

SUSPENSION OF A VALVE PLATE OF A VACUUM VALVE

BACKGROUND OF THE INVENTION a) Field of the Invention

The invention is directed to a suspension of a valve plate of a vacuum valve at a valve rod. The invention is further directed to a vacuum valve with a valve body having a valve opening with a valve seat, a valve plate which is suspended at a valve rod, and an actuation device by means of which the valve plate is movable from its open position initially into a position in which it is located opposite to the valve opening, but is lifted from the valve seat, and then can be pressed against the valve seat.

b) Description of the Related Art

Vacuum valves of the plate valve type in which the valve opening is closed by a valve plate which is pressed against the valve seat surrounding the valve opening are known in many different constructional forms.

A first conventional embodiment form of such plate valves is the slide valve. In slide valves, in order to close the valve, the valve plate is initially displaced by an actuation device linearly in one direction transverse to the sealing surface until it reaches a position opposite to the valve opening, but in which it is lifted from the valve seat. Subsequently, a movement is carried out vertical to the sealing surface and in the direction of the longitudinal axis of the valve opening, so that the valve plate is pressed against the valve seat. This two-step movement process is required so that the seal of elastic material, for example, Viton, is not exposed to shearing stress, which would lead to impermissible wear. The second step of the closing movement is achieved in different ways in slide valves of this kind, for example, by means of lifting mechanisms, rolling bodies which are guided in wedge-shaped gaps between the valve plate and a supporting plate, tilting elements, and so on. In order to prevent bending of the valve rod in the second movement step (movement vertical to the sealing surface and valve opening), a counter-plate is usually provided which is simultaneously moved against a wall located opposite to the valve seat. Such slide valves are known, for example, from U.S. Pat. No. 4,560,141 A, DE 3209217 C2, DE 3224387 C2, and U.S. Pat. No. 3,185,435 A.

In a special type of plate valve or slide valve, the second movement step, that is, the movement of the valve plate against the valve seat is carried out by a movement which is directed essentially vertical to the sealing surface in that the valve rod is swiveled about a pivot point. This pivot point can be formed by pins or rollers arranged laterally at the valve rod and which are guided in guide grooves. The valve rod is accordingly constructed in the manner of a lever which is initially linearly displaced and then tilted. The construction must be correspondingly sturdy to prevent deformation of the valve rod when the valve plate is pressed against the valve seat. Examples of valve constructions of this kind are shown in U.S. Pat. Nos. 5,415,376 A, 5,641,149 A, 6,045,117 A, 5,934,646 A, 5,755,255 A, 6,082,706 A, and 6,095,180 A.

In another type of plate valve, there is no linear displacement of the valve plate in the first movement step, but rather a swiveling along a circular arc in order to move the valve plate into the position located opposite from the valve opening. For this purpose, the valve rod is suspended at a shaft by its end located opposite to the valve plate so as to be swivelable about an axis vertical to the valve surface. The second step of the closing movement of the valve plate in the direction of the valve seat is carried out by means of a linear displacement of this shaft. It is also already known to suspend the valve plate at this shaft by means of a swivel bearing, wherein a spring device pretensions the valve plate in the position in which it is lifted from the valve seat. The second step of the closing movement is carried out in that the shaft is displaced linearly in a direction which runs parallel to the central axis of the valve opening, but which faces away from the valve opening. A kind of bulge in the valve rod which is arranged in the middle area of the valve rod is accordingly pressed against a wall of the valve body and rolls along this wall, so that the valve plate is displaced against the valve opening. The valve plate is connected with the valve rod via a rotating or swiveling bearing.

OBJECT AND SUMMARY OF THE INVENTION

It is the primary object of the invention to provide a suspension of a valve plate of a vacuum valve at a valve rod which improves the contact of the valve plate at the valve seat. It is another object of the invention to provide a suspension of a valve plate at a valve rod so as to simplify the valve construction and economize on material. Another object of the invention is to provide a vacuum valve of the type mentioned above with a suspension of the valve plate at the valve rod in such a way that the contact of the valve plate at the valve seat is improved, the seal is protected and the construction of the valve is simplified and is economical with respect to material.

According to the invention, these and other objects proceeding from the description are met by a suspension of the valve plate at the valve rod which comprises a bearing block of rubber-elastic material with first and second side surfaces, one of which side surfaces is fastened to the valve rod or to a plate which is rigidly connected with the latter, and the other side surface is fastened to the valve plate or to a plate which is rigidly connected with the latter, wherein an inelastic force transmission part is embedded in the rubber-elastic material of the bearing block and extends at oppositely located points or along oppositely located lines up to the side surfaces of the bearing block.

The rubber-elastic material of the bearing block makes it possible for the valve plate to tilt relative to the valve rod, wherein the points or lines of the force transmission part which extend up to the surfaces of the side surfaces of the bearing block form swivel points or swivel lines for the swiveling of the valve plate relative to the valve rod. Further, a small longitudinal movement of the valve plate relative to the valve rod is also made possible as will be explained in more detail in the following. The inelastic force transmission part which is embedded in the rubber-elastic material of the bearing block also serves to transmit the contact pressing force of the valve rod to the valve plate in order to ensure long-term strength of the suspension when used over a longer period with a plurality of opening and closing processes of the valve. When opening the valve, the elastic material of the bearing block also causes the valve plate to return to the zero position.

Further, the suspension according to the invention has the advantage that when the valve plate is swiveled relative to the valve rod or when the valve plate is moved longitudinally relative to the valve rod there is hardly any release of particles which would otherwise impair the functionality of the chambers for sensitive processes with respect to impurities (for example, when handling wafers with highly pure surfaces). The occurrence of such particles cannot be prevented in principle during the movement of two parts relative to one another, in this case, during the movement of the surfaces contacting the force transmission element relative to the latter. However, in the suspension according to the invention, these particles are enclosed by the material of the bearing block and can accordingly not be released into the vacuum.

The various features and developments according to the invention are indicated in the claims.

Further advantages and details of the invention are explained more fully in the following with reference to the embodiment examples which are shown in the drawing, wherein further details of the invention are also indicated.

BRIEF DESCRIPTION OF THE DRAWINGS

In the accompanying drawing:

FIGS. 1 and 2 show schematic views of a first embodiment example of a plate valve according to the invention in the open and closed state of the valve;

FIGS. 6 and 7 show schematic views of another embodiment example of a suspension according to the invention in perspective and in cross section;

FIGS. 8 and 9 show schematic views of another embodiment example of a suspension according to the invention in perspective and in cross section.

DESCRIPTION OF THE PREFERRED EMBODIMENTS

Figure 3:
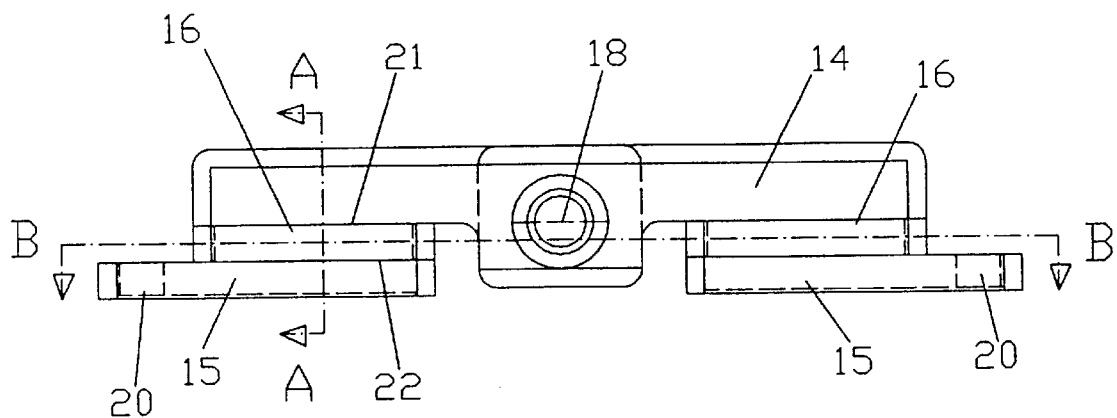
FIG. 3 shows a top view of a suspension according to the invention (viewed in axial direction of the valve rod)

The plate valve shown schematically in FIGS. 1 and 2 comprises a valve body 1 in which a valve opening 2 is provided. The center axis 3 of this valve opening 2 defines the through-flow direction of the valve. The valve opening 2 is surrounded by a valve seat 4 which forms the sealing surface of the valve, wherein the sealing surface extends vertical to the axis 3.

A valve plate 5 which is constructed so as to be circular, for example, is suspended at a valve rod 6. By means of an actuating device which is not shown in detail in FIGS. 1 and 2, the valve plate 5 can be moved from the open position shown in FIG. 1 into the closed position shown in FIG. 2. For this purpose, pins 8 which are arranged in the area of the rear end of the valve rod and which project (vertical to the drawing plane) over the valve rod 6 on either side are initially displaced linearly by the actuation device, namely, along portion 9 of the movement path of the pins 8 which is indicated in FIGS. 1 and 2 by a dashed in e. Further, guide paths 11 which are indicated in FIGS. 1 and 2 by dashed lines are provided for the linear displacement of the valve rod 6 and, along with the latter, of the valve plate 5 in this first phase of the closing movement, which guide paths 11 guide pins 12 which are arranged in the middle area or in the front half of the valve rod and which project at either side of the valve rod (again vertical to the drawing plane). At the front end of portion 9 of the movement path of the pin 8, the valve plate 5 occupies a position which is located opposite from the valve opening 2, but which is lifted from the valve seat 4.

Subsequently, the pin 8 is moved by the actuation device along portion 10 of the guide path indicated in dashed lines in FIGS. 1 and 2. The valve rod 6 is accordingly swiveled about the pins 12 which serve as a pivot point and the valve plate moves toward the valve seat 4 and is pressed against it.

Plate valves of this kind are known in different embodiment forms, for example, from U.S. Pat. Nos. 6,095,180 A, 5,641,149 A and other references cited in this connection in the introductory part of the specification. Therefore, the actuation device and exact construction of the valve rod and its guides need not be described in more detail in this place. These parts are prior art and are not the subject matter of the present invention.

The present invention is directed to the suspension of the valve plate at the valve rod, which suspension is provided in this valve. The suspension is shown only schematically in FIGS. 1 and 2 and comprises a plate 14 which is rigidly connected by its back to the valve plate 5, a plate 15 which is rigidly connected to the valve rod 6, and a bearing block 16 of rubber-elastic material which is fastened to the surfaces of the plates 14 and 15 which face one another. An inelastic force transmission part 17 which can be constructed, for example, as a cylinder and which is oriented vertical to the longitudinal extension of the valve rod 6 and vertical to the axis 3 is embedded in the bearing block 16. The outer surface of the force transmission part 17 extends along oppositely located points or lines to the side surfaces of the plates 14 and 15 which face one another and contacts these plates 14 and 15.

Figure 4:
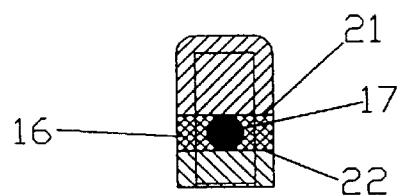
FIG. 4 shows a section along line A—A of FIG. 3.
Figure 5:
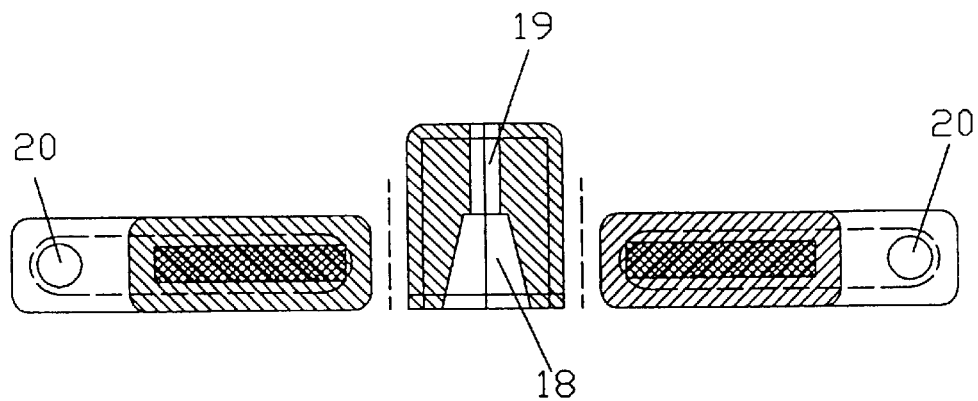
FIG. 5 shows a section along line B—B of FIG. 3.

A preferred embodiment example of the suspension of the valve plate at the valve rod is shown in detail in FIGS. 3 to 5. The plate 14 has a conically tapering opening 18 adjoined by a through-hole 19 at its bottom. The opening 18 serve to receive the front end of the valve rod, which front end is likewise conical and is provided with a threaded bore hole at its front side. The valve rod can be tightened through the through-opening 19 by means of a screw in the opening 18. On either side of the opening 18, bearing blocks 16 made of rubber-elastic material are fastened to the side of the plate 14 facing the valve plate to be suspended. Another plate 15 is fastened to the side surfaces of the bearing blocks 16 located opposite to the plate 14. These plates 15 project laterally over the plate 14 and have bore holes 20 in this area, through which the valve plate can be screwed to the plates 15.

A cylindrical force transmission part 17 which extends along opposite lines to the side surfaces 21, 22 of the respective bearing block 16 and which, along these lines, contacts the side surfaces of the plates 14, 15 facing each other and forms a line-shaped bearing or support is embedded in the rubber-elastic material of the bearing blocks 16.

The plates 14 and 15 could also have a shape other than that shown in FIGS. 3 to 5, wherein an individual continuous plate 15 could also be provided. Further, an individual continuous bearing block 16 with one or more force transmission parts embedded therein could also be provided. Further, more than two bearing blocks of this kind could also be provided.

The force transmission part or force transmission parts could also have a shape other than a cylindrical shape, for example, the shape shown in the schematic views in FIGS. 6 and 7 or FIGS. 8 and 9. In the embodiment example according to FIGS. 6 and 7, the force transmission part 17 is triangular in cross section and extends along oppositely located lines 23, 24 to the side surfaces 21, 22 of the bearing block 16. In the embodiment example according to FIGS. 8 and 9, the force transmission part 17 is constructed as a ball and extends at oppositely located points 25, 26 to the side surfaces of the bearing block. A mutual tilting of the plates 14, 15 about two axes at right angles to one another is made possible in this way.

In addition to the tilting of the valve plate 5 relative to the valve rod 6, the suspension according to the invention also makes possible a smaller axial displacement of the valve plate relative to the valve rod 6.

Since it is possible for the valve plate 5 to tilt relative to the valve rod, bending of the valve rod caused by closing force exerted on the valve rod can be compensated by the suspension, so that an essentially uniform contact pressing force is exerted on the seal 13, namely, along the entire circumference of this seal. Further, the valve rod is shortened in a way (viewed in the direction of the linear displacement of the valve plate) by the bending of the valve rod. This axial displacement of the front end of the valve rod relative to the valve plate can also be absorbed by the suspension according to the invention.

Figure 10:
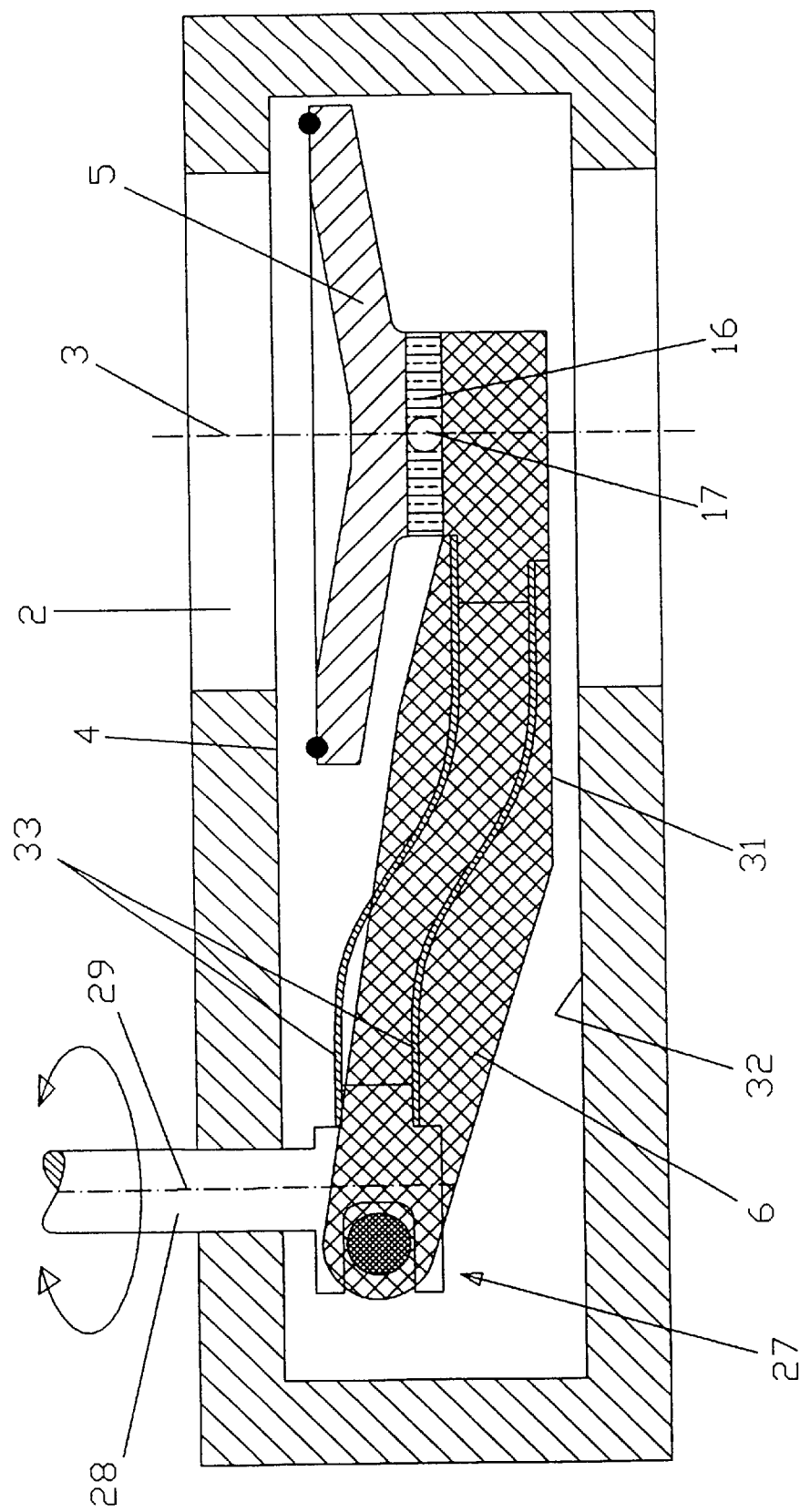
FIGS. 10 and 11 shows schematic views of another embodiment example of a valve according to the invention in a position between the opened and closed position of the valve (FIG. 10) and in the closed position of the valve (FIG. 11).
Figure 11:
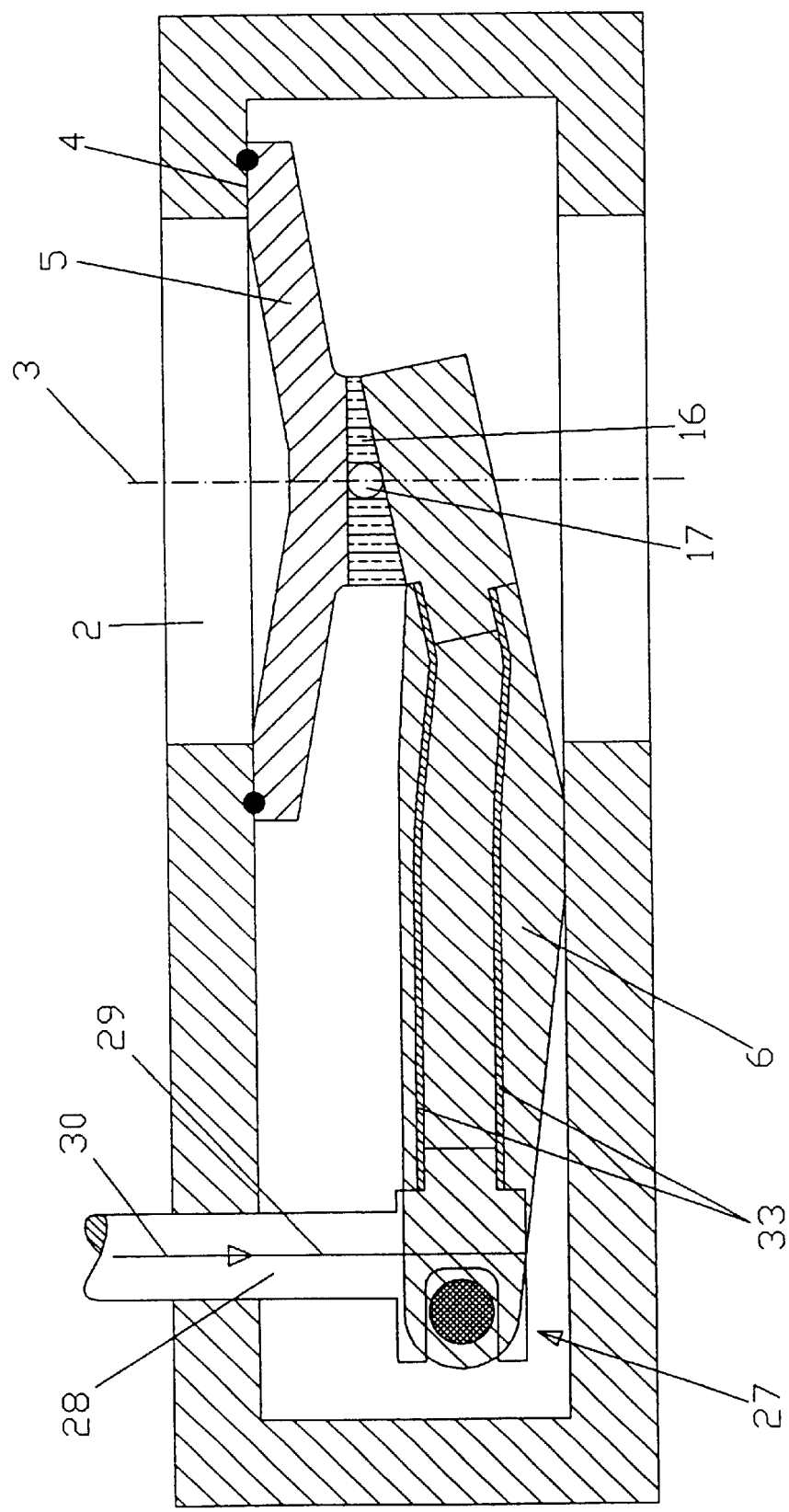

Another embodiment example of a valve according to the invention is shown schematically in FIGS. 10 and 11. The valve rod 6 is suspended at a shaft 28 by its end remote of the valve plate via a pivot bearing 27. This shaft is swivelable about an axis 29 extending parallel to the center axis 3 of the valve opening 2 by an actuation device, not shown. By swiveling the shaft 28, the valve plate 5 suspended at the valve rod 6 swivels from a position in which it completely releases the valve opening 2 into the position shown in FIG. 10. In this position shown in FIG. 10, the valve plate is arranged in a position which is located opposite from the valve opening 2, but in which it is lifted from the valve seat 4.

In order to close the valve completely, the shaft 28 is displaced linearly in the direction of the arrow 30 shown in FIG. 11. A surface 31 of the valve rod which is curved outward in a convex manner is displaced against a surface 32 of the valve body, so that the valve rod 6 rolls along this valve body surface 32 and is swiveled relative to the shaft 28. The contact area of the surfaces 31 and 32 acts like a swivel axis for the valve rod, so that the valve disk is swiveled in the direction of the valve seat and is pressed against it. This leads to a swiveling of the valve disk 5 relative to the valve rod about the inelastic force transmission part 17 embedded in the bearing block 16 of elastic material. In the present embodiment example, the bearing block 16 is fastened directly to the back of the valve plate 5 (but is again preferably the intermediary connection of a plate).

A spring device in the form of leaf springs 33 acting between the shaft 28 and the front end of the valve rod 6 swivels the valve rod relative to the shaft 28 back into the initial position when the shaft 28 is displaced linearly initially opposite to the direction of arrow 30 to open the valve.

In order to produce the suspension according to the invention, the parts to be connected by the bearing block 16, that is, the plates 14 and 15 and the valve plate 5 and valve rod 6, can initially be aligned relative to one another in a corresponding die or tool, wherein the force transmission part 17 or plurality of force transmission parts 17 has already been brought into the predetermined position. Subsequently, in order to produce the bearing block, rubber-elastic material is introduced between the parts to be connected and, when vulcanized, connects to the opposite surfaces of the parts to be connected.

Instead of this vulcanizing, the bearing block could also be glued to the parts to be connected. In principle, it is also conceivable and possible to provide a mechanical connection between the bearing block and the plates 14, 15 or valve plate and valve rod, respectively, instead of a material bond.

The force transmission part is preferably made of metal. Other materials are also possible in principle for constructing the force transmission part, for example, ceramics or plastics.

The force transmission part can also be constructed in a different shape than that shown. It need only reach the opposite side surfaces of the bearing block so as to contact by points or lines, so that it is possible for the parts contacting the side surfaces of the bearing block to swivel around these punctiform or line-shaped bearing supports.

A suspension according to the invention can also be used for plate valves other than those shown. The use of a suspension according to the invention can also be advantageous in valves in which there is no bending of the valve rod due to design (for example, because counter-bearings are used), so as to compensate for manufacturing tolerances in the alignment between the valve plate and the valve seat or to allow tolerances of this kind to a greater extent.

While the foregoing description and drawings represent the present invention, it will be obvious to those skilled in the art that various changes may be made therein without departing from the true spirit and scope of the present invention.

REFERENCE NUMBERS 1 valve body
2 valve opening
3 axis
4 valve seat
5 valve plate
6 valve rod
7 actuation device
8 pin
9 portion
10 portion
11 guide path
12 pin
13 seal
14 plate
15 plate
16 bearing block
17 force transmission part
18 opening
19 through-hole
20 bore hole
21 side surface
22 side surface
23 line
24 line
25 point
26 point
27 pivot bearing
28 shaft
29 axis
30 arrow
31 surface
32 surface
33 leaf spring

What is claimed is:
1. A suspension of a valve plate of a vacuum valve at a valve rod, comprising:

a bearing block of rubber-elastic material with first and second side surfaces;

one of said side surfaces being fastened to the valve rod or to a plate which is rigidly connected with the valve rod and the other side surface being fastened to the valve plate or to a plate which is rigidly connected with the valve plate;

a seal located on the valve plate;

wherein an inelastic force transmission part is embedded in the rubber-elastic material of the bearing block and extends at oppositely located points or along oppositely located lines up to the side surfaces of the bearing block to form a swivel point for swivelling of the valve plate about the inelastic force transmission part relative to the valve rod so that an essentially uniform contact pressing force is exerted on the seal along the entire circumference of the seal.

2. The suspension according to claim 1, wherein the side surfaces of the bearing block are vulcanized rubber and connected to the valve rod or the plate rigidly connected therewith on one side and to the valve plate or the plate rigidly connected therewith on the other side.

3. The suspension according to claim 1, wherein the force transmission part is formed by a cylinder which is oriented vertical to the longitudinal extension of the valve rod and vertical to the center axis of the valve opening.

4. The suspension according to claim 1, wherein the force transmission part is made of metal.

5. A vacuum valve comprising:

a valve body having a valve opening with a valve seat;

a valve plate which is suspended at a valve rod; and all actuation device by which the valve plate is movable from its open position initially into a position in which it is located opposite to the valve opening, but is lifted from the valve seat, and then can be pressed against the valve seat;

wherein at least one bearing block made of rubber-elastic material is provided for the suspension of the valve plate at the valve rod;

said bearing block having oppositely located side surfaces, one of said side surfaces being fastened to the valve rod or to a plate which is rigidly connected with the valve plate, and the other side surface being fastened to the valve plate or to a plate which is rigidly connected with the latter; and an inelastic force transmission part being embedded in the rubber-elastic material of the bearing block and extending at oppositely located points or along oppositely located lines up to the side surfaces of the bearing block to form a swivel point for swivelling of the valve plate about the inelastic force transmission part relative to the valve rod so that an essentially uniform contact pressing force is exerted on the valve plate.

6. A method for producing a suspension of a valve plate of a vacuum valve at a valve rod, comprising the steps of:

positioning at least one force transmission part between the valve rod or a plate to be rigidly connected with the valve rod and the valve plate or a plate to be rigidly connected with the valve plate;

said force transmission part contacting mutually facing side surfaces of the two parts to be connected at points or along a line and which extend up the side surfaces of a bearing block; and the bearing block of a rubber-elastic material which can be vulcanized and located between two oppositely located side surfaces of the two parts to be connected, the at least one force transmission part being embedded therein to form a swivel point for swivelling of the valve plate about the inelastic force transmission part relative to the valve rod so that an essentially uniform contact pressing force is exerted on the valve plate.

\* \* \* \* \*

UNITED STATES PATENT AND TRADEMARK OFFICE
CERTIFICATE OF CORRECTION

PATENT NO. : 6,471,181 B2
DATED : October 29, 2002
INVENTOR(S) : Bernhard Duelli It is certified that error appears in the above-identified patent and that said Letters Patent is hereby corrected as shown below:

Column 7,
Line 32, change "all" to -- an --

Column 8,
Line 7, change "plate" to -- rod --.
Line 9, change "latter" to -- valve plate --.

Signed and Sealed this

Twenty-second Day of March, 2005

JON W. DUDAS
*Director of the United States Patent and Trademark Office*